United States Patent
Liebman et al.

(10) Patent No.: US 7,359,894 B1
(45) Date of Patent: Apr. 15, 2008

(54) METHODS AND SYSTEMS FOR REQUESTING AND PROVIDING INFORMATION IN A SOCIAL NETWORK

(75) Inventors: Jason B. Liebman, New York, NY (US); Krishna A. Bharat, San Jose, CA (US)

(73) Assignee: Google Inc., Mountain View, CA (US)

( * ) Notice: Subject to any disclaimer, the term of this patent is extended or adjusted under 35 U.S.C. 154(b) by 350 days.

(21) Appl. No.: 10/881,643

(22) Filed: Jun. 30, 2004

(51) Int. Cl.
  *G06F 17/30* (2006.01)
(52) U.S. Cl. .............................. 707/3; 707/10; 707/102
(58) Field of Classification Search ................... 707/2, 707/3, 5, 8, 9, 10, 100, 101, 103 R, 104.1; 709/203, 204, 217, 218, 219, 223, 224, 246; 715/501.1, 738, 751, 760, 779
See application file for complete search history.

(56) References Cited

U.S. PATENT DOCUMENTS

| | | | |
|---|---|---|---|
| 5,796,393 A * | 8/1998 | MacNaughton et al. .... 715/733 |
| 6,256,648 B1 | 7/2001 | Hill et al. |
| 6,389,372 B1 | 5/2002 | Glance et al. |
| 6,421,678 B2 * | 7/2002 | Smiga et al. ................ 707/102 |
| 6,442,567 B1 * | 8/2002 | Retallick et al. .......... 707/104.1 |
| 6,594,673 B1 | 7/2003 | Smith et al. |
| 2002/0116466 A1 | 8/2002 | Trevithick et al. |
| 2002/0124053 A1 | 9/2002 | Adams et al. |
| 2003/0020977 A1 * | 1/2003 | Smith et al. ................. 359/110 |
| 2003/0050977 A1 | 3/2003 | Puthenkulam et al. |
| 2004/0042599 A1 | 3/2004 | Zaner et al. |
| 2004/0088325 A1 | 5/2004 | Elder et al. |
| 2004/0122803 A1 | 6/2004 | Dom et al. |
| 2005/0198031 A1 * | 9/2005 | Pezaris et al. ................. 707/9 |
| 2005/0209999 A1 * | 9/2005 | Jou ............................. 707/2 |
| 2005/0210409 A1 * | 9/2005 | Jou ........................... 715/811 |
| 2005/0267766 A1 * | 12/2005 | Galbreath et al. .............. 705/1 |
| 2006/0004789 A1 * | 1/2006 | Lunt et al. .................. 707/100 |

FOREIGN PATENT DOCUMENTS

| | | |
|---|---|---|
| JP | 11265369 A | 9/1999 |
| JP | 2002132604 A | 5/2002 |
| WO | WO 00/68860 A2 | 11/2000 |
| WO | WO 00/68860 A3 | 11/2000 |

OTHER PUBLICATIONS

Adamic, Lada et al., Web Site, "A Social Network Caught in the Web," web page at http://firstmonday.org/issues/issue8_6/adamic/, as available via the Internet and printed on Jul. 28, 2004.

(Continued)

*Primary Examiner*—Jacques Veillard
(74) *Attorney, Agent, or Firm*—Fenwick & West LLP

(57) ABSTRACT

The present invention relates to methods and systems for requesting and providing information in a social network. A method can comprise outputting an information request interface, which can provide a user with the ability to request information from at least one member of a social network associated with the user. One or more members of the social network can be notified of the user's information request and can provide, or assist in providing, the requested information to the user.

59 Claims, 4 Drawing Sheets

OTHER PUBLICATIONS

Multiply, "About Multiply," web page at http://multiply.com/info/about, as available via the Internet and printed on May 3, 2004.

Multiply, "Help," web page at http://multiply.com/info/help, as available via the Internet and printed on May 3, 2004.

Microsoft Corporation, "Is Friendster the 'Next Big Thing'?" web page at http://mobilemomentum.msn.com/article.aspx?aid=4, as available via the Internet and printed on Jul. 29, 2004.

Multiply, "Multiply Privacy Policy," web page at http://multiply.com/info/privacy, as available via the Internet and printed on May 3, 2004.

Multiply, "Multiply Terms of Service," web page at http://multiply.com/info/tos, as available via the Internet and printed on printed May 3, 2004.

Doctorow, copy, "Running Notes From Revenge of the User: Lessons from Creator/User Battles," web page at http://craphound.com/danahetcon04.txt, as available via the Internet and printed Jul. 28, 2004.

Sullivan, Danny, "Is It Really Personalized Search?," http://searchengine watch.com, printed on May 13, 2004.

Accounts, Website, web page at http://www.cs.rice.edu/~ssiyer/accounts/, as available via the Internet and printed on Jul. 29, 2004.

Tribe.net, "Listings Directory," web page at http://www.tribe.net/tribe/servlet/template/pub,Listings.vm, as available via the Internet and printed on Jun. 28, 2004.

Google, Inc., "Google Answers," web page at http://answers.google.com/answers/, as available via the Internet and printed on Jul. 29, 2004.

Google, Inc., "Google Answers: Frequently Asked Questions," web page at http://answers.google.com/answers/faq.html, as available via the Internet and printed on Jul. 29, 2004.

Yahoo! Inc., "Yahoo! Groups," web page at http://groups.yahoo.com, as available via the Internet and printed on Jul. 29, 2004.

Yahoo! Inc., "Yahoo! Help—Groups," web page at http://help.yahoo.com/help/us/groups/groups-01.html, as available via the Internet printed on Jul. 29, 2004.

Yahoo! Inc., "Yahoo! Help—Groups Database," web page at http://help.yahoo.com/help/us/groups/database, as available via the Internet and printed on Jul. 29, 2004.

* cited by examiner

METHODS AND SYSTEMS FOR REQUESTING AND PROVIDING INFORMATION IN A SOCIAL NETWORK

FIELD OF THE INVENTION

The invention generally relates to social networks. More particularly, the invention relates to methods and systems for requesting and providing information in a social network.

BACKGROUND

Conventional websites such as those hosted on Friendster™, Yahoo!™, Tribe™, Tickle™, or other web sites, facilitate interaction between members of a network or group. Members of such networks can have a variety of backgrounds, interests, and other characteristics.

Members of such networks may be interested in requesting information or assistance from other members. Some members of such networks may be willing to share their knowledge, experiences, and other information with other members of the network. Members interested in requesting information or assistance may only wish to request information or assistance from certain members of the network. The development of systems and methods for members of such networks to request information from other members, and for members of such networks to provide requested information to other members would be useful to members.

SUMMARY

Embodiments of the present invention include methods and systems for requesting and providing information in a social network. One embodiment of a method of the present invention includes outputting an information request interface. The information request interface, in this embodiment, can provide a user with the ability to request information from at least one member of a social network associated with the user. An information request can be received from a user of the social network. One or more members of the social network can be notified of the user's information request. Embodiments can further include outputting an information delivery interface. The information delivery interface can provide one or more members of the social network with the ability to provide the requested information to the user. The information provided by the one or more members can be outputted.

The above embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

DETAILED DESCRIPTION

Embodiments of the present invention relate to methods and systems for requesting and providing information in a social network. Exemplary embodiments are described below.

Overview

Embodiments of the present invention allow a user of a social network to request information from other members. The information request can include, for example, a recommendation request, an advice request, a request for assistance, or a request for search assistance. In one embodiment, a method of the present invention includes outputting an information request interface. The information request interface can provide a user with the ability to input an information request. When a user provides an information request, one or more members of the social network can be notified of the user's information request. The user can provide parameters related to which users should be notified in some embodiments.

Embodiments of the present invention can allow members of the present invention to provide the requested information to the user. Such embodiments can include outputting an information delivery interface, which can assist members in providing the requested information. The requested information can be provided to the user and can be made available to other members of the social network in some embodiments.

System Architecture

Figure 1:
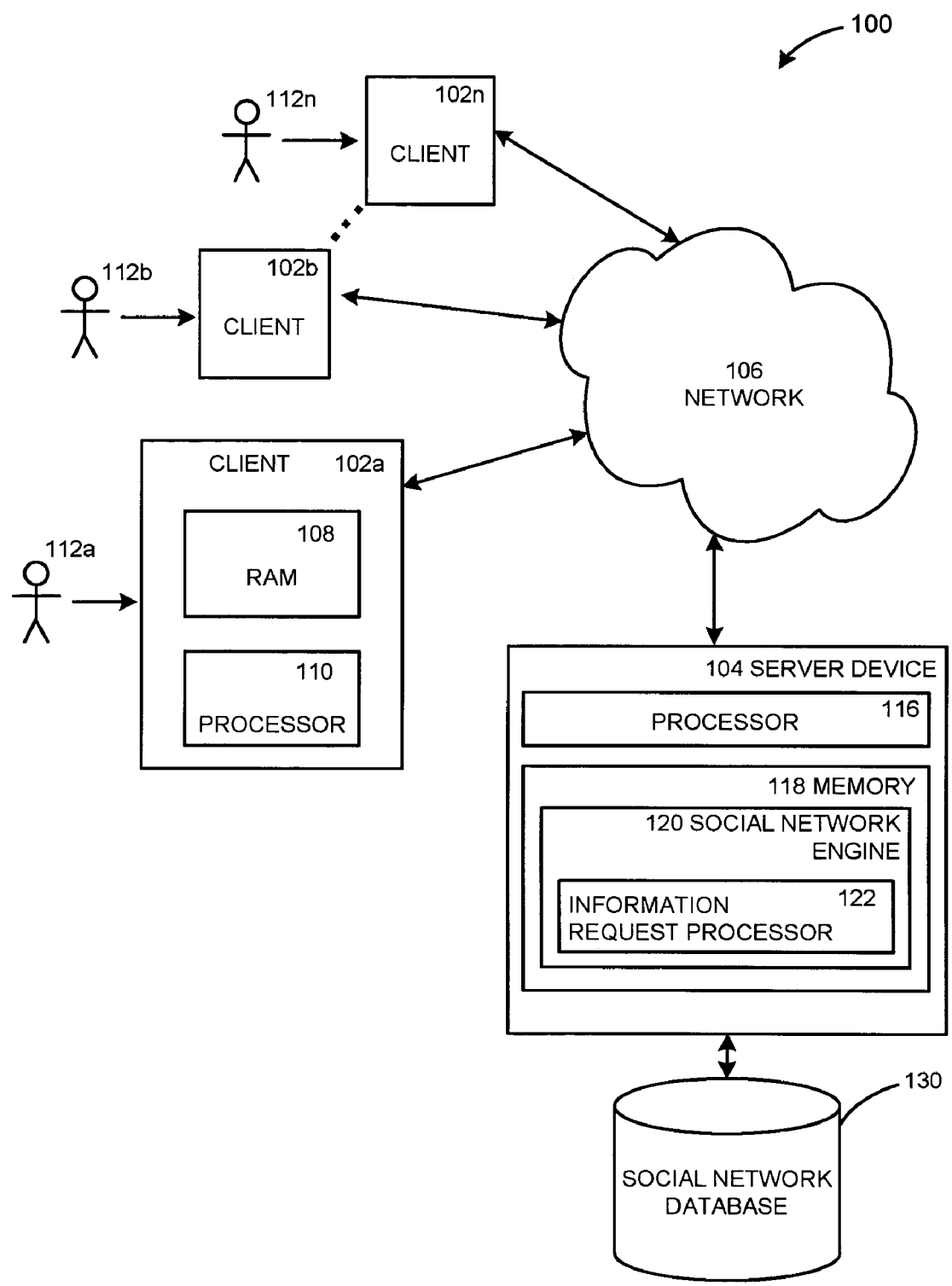
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106.

The server device 104 shown comprises a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains a social network engine application program, also known as a social network engine 120. The social network engine 120 facilitates members, such as user 112a, interacting with and participating in a social network. A social network can comprise profiles that can be associated with other profiles. Each profile may represent a member and a member can be, for example, a person, an organization, a business, a corporation, a community, a fictitious person, or other entity. Each profile can contain entries, and each entry can comprise information associated with a profile. Examples of entries for a person profile can comprise information regarding relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines, email addresses, location information, IM name, phone number, address, skills, career, or any other information describing, identifying, or otherwise associated with a profile. Entries for a business profile can comprise market sector, customer base, location, supplier information, net profits, net worth, number of employees, stock performance, or other types of information associated with the business profile. Additionally, entries within a profile can comprise associations with other profiles. Associations between profiles within a social networks can include, for example, friendships, business relationships, acquaintances, community associations, activity partner associations, common interest associations, common characteristic associations, or any other suitable type of association between profiles.

A social network can also comprise communities. Communities within a social network can represent groups of members sharing common interests or characteristics. Communities can comprise subcommunities, and multiple communities can be arranged into global communities. Subcommunities can comprise groups of profiles within a larger community that share common interests or characteristics independent from the entire community. For example, a "basketball players" community can comprise members who enjoy playing basketball from all around the world. A subcommunity within the basketball community can comprise members specific to a local geographical area. Thus, users in California can form a "California basketball players" community. Global communities can comprise groups of communities sharing similar characteristics. For example, the "basketball players" community and a "basketball watchers" community can be grouped under a global "basketball" community.

The social network engine can comprise an information request processor 122. The information request processor 122 can facilitate the ability of a user 112 to request information from other members, and the ability of other members to provide requested information to the user 112. The information request processor 122 can cause the display on the client device 102a of an information request interface. The information request processor 122 can also cause the display on a client device of an information delivery interface. The information request processor 122 can cause the display of information provided by one or more members of the social network on a client device. The information request processor 122, in some embodiments, can generate, distribute, and/or update a search record. The information request processor 122 can update a profile of a member that provides information in response to an information request to indicate that the member responded. The information request processor 122 can perform any number of other operations associated with embodiments of the present invention. In addition, multiple processors and other hardware can be provided to perform operations associated with embodiments of the present invention.

Server device 104 also provides access to storage elements, such as a social network storage element, in the example shown in FIG. 1, a social network database 130. The social network database 130 can be used to store member profiles. Data storage elements may include any one or combination of methods for storing data, including without limitation, arrays, hash tables, lists, and pairs. Other similar types of data storage devices can be accessed by the server device 104. The social network engine 120 can receive data comprising the members profiles from the social network database 130 and can also send data comprising member profiles to the social network database 130 for storage. The social network database 130 may be physically attached or otherwise in communication with the social network engine 120 by way of a network or other connection.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the social networks and methods illustrated in FIGS. 2-4.

Exemplary Social Network

Figure 2:
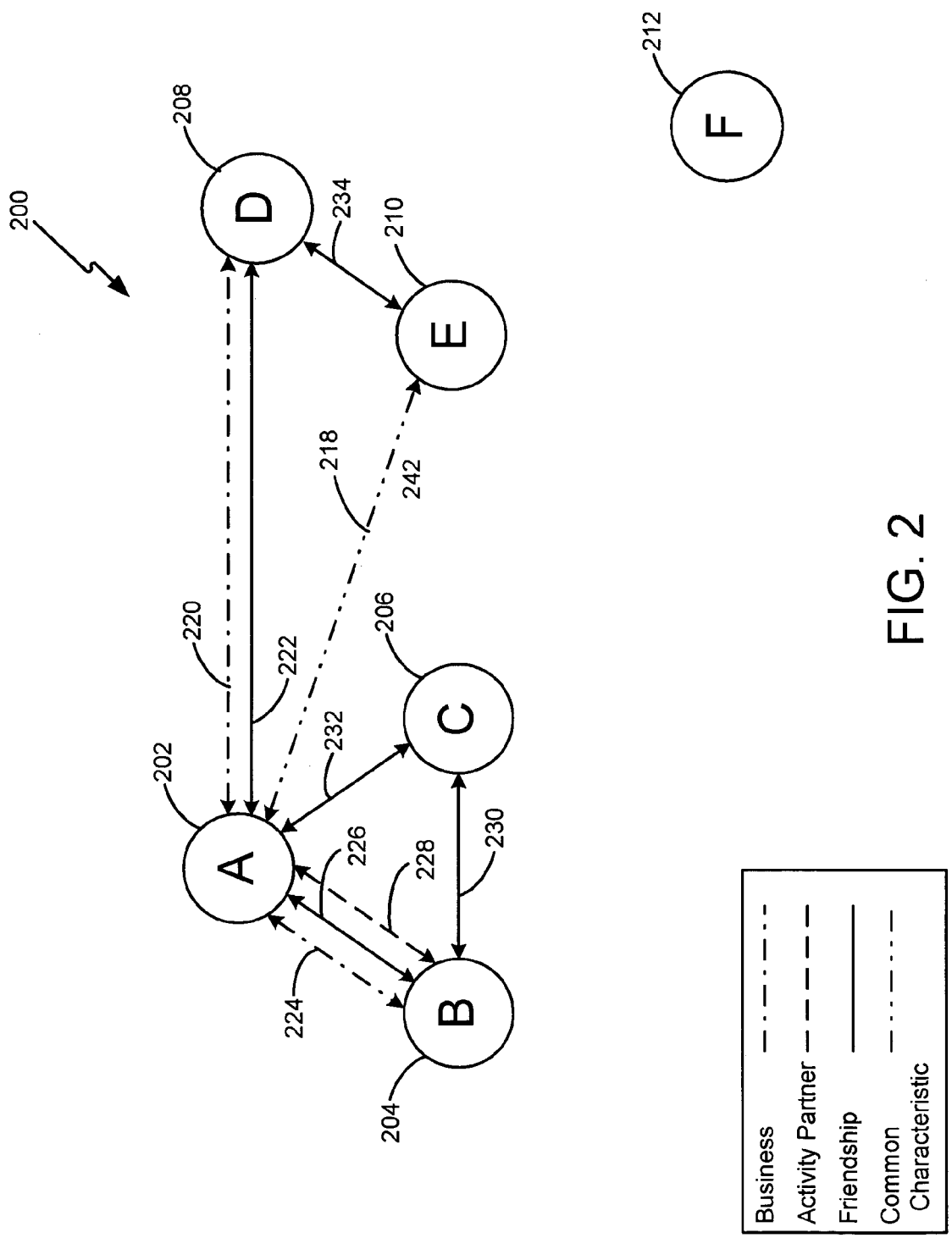
FIG. 2 illustrates one embodiment of a social network according to one embodiment of the present invention.

FIG. 2 illustrates an exemplary embodiment of a social network 200. According to the embodiment illustrated in FIG. 2, the social network 200 comprises a graph comprising vertices 202-212 and edges 220-234. The vertices 202-212 comprise profiles A-F. Each profile can represent a member. The edges 218-234 comprise associations between profiles. According to the embodiment shown in FIG. 2, the social network 200 comprises a plurality of differing types of associations represented by edges 220-234. The types of associations listed in FIG. 2 for illustration purposes are business associations, activity partner associations, friendship associations, community associations, and common characteristic associations. Common characteristic associations can include associations based on some characteristic such as attending the same high school or being from the same hometown, but can indicate a lower level of significance that another type of association, such as a friendship association.

For example, edge 220 and edge 222 each comprise an association between profile A at vertex 202 and Profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A-F comprising the vertices 202-212, for purposes of illustration is a person. Other types of members can be in social network 200. The associations 220-234 illustrated in FIG. 2 comprise bi-directional associations. The associations are bi-directional because when one profile, for example profile A, is associated with another profile, for example profile D, then profile D is also associated with profile A. In one embodiment, A and D will not be associated with each other until both profiles consent to such association; e.g., A may invite D to be associated therewith, and the association occurs upon D's acceptance of such invitation. The invitation, for example, may include sending an email or other message to D indicating that A has requested an association with D.

Other embodiments of the present invention may comprise directed associations or other types of associations. Directed associations associate a first profile with a second profile while not requiring the second profile to be associated with the first profile. For example, in a directed chart, profile A can be associated by a friendship association with profile B, and profile B can be unassociated by a friendship connection with profile A. Thus a display of profile A's friends would include profile B, but a display of profile B's friends would not include profile A.

Within a social network, a degree of separation can be determined for associated profiles. One method of determining a degree of separation is to determine the fewest number of edges of a certain type separating the associated profiles. This method of determining a degree of separation can produce a type-specific degree of separation. A type-specific degree of separation is a degree of separation determined based on one particular type of association. For example, a profile A has a friend association degree of separation of two from profile E. The fewest number of friendship associations between profile A and profile E is two—the friendship association comprising edge 220 and the friendship association comprising edge 234. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each associations and a corresponding weighting factor prior to summing the associations. Thus, highly weighted associations would contribute less to the resulting sum than lower weighted associations.

Processes

Various methods may be implemented in the environment shown in FIG. 1 and other environments, according to the present invention. Methods according to the present invention may be implemented by, for example, a processor-executable program code stored on a computer-readable medium.

Various methods in accordance with embodiments of the present invention may be carried out. One embodiment of a method according to the present invention includes outputting an information request interface, wherein the information request interface provides a user with the ability to request information from at least one member of a social network associated with the user; receiving an information request from the user; and notifying one or more members of the social network of the user's information request.

Another embodiment of a method of the present invention can include outputting an information request interface, wherein the information request interface provides a user with the ability to request information from at least one member of a social network associated with the user; receiving an information request from the user; notifying one or more members of the social network of the user's information request; outputting an information delivery interface, wherein the information delivery interface provides one or more members of the social network with the ability to provide the requested information to the user; displaying information provided by one or more members; and updating a profile of a member that provides information in response to the information request to indicate that the member responded.

In accordance with various embodiments of the present invention, a user of a social network can request a wide variety of information from members of the social network. As used herein, the term "user" will refer to a member of a social network that requests information or assistance from other members of the social network as set forth herein. While the "user" is understood to be a member of the social network, the term "user" was selected to differentiate this member from the other members of the social network who may provide assistance or the requested information. A different term was selected in order better explain the present invention without having to continually modify the term "member."

In some embodiments, the information request can include a recommendation request, an advice request, or a request for assistance. Such categories of requests are not intended to be mutually exclusive (e.g., an information request, in some embodiments, may be both a recommendation request and an advice request). Further, other categories of requests, while not specifically recited herein, can also be encompassed by the term information request.

Generally, when a user requests a recommendation, the user may be planning to make a purchase, attend an event, utilize a service, or otherwise make a decision, and seeks to gain information based on the experiences of members of the social network to assist with the decision. Examples of recommendation requests can include, without limitation, restaurant recommendations, recipe recommendations, beverage recommendations, wine recommendations, movie recommendations, music recommendations, television show recommendations, recommendations for medical professionals, college/university recommendations, recommendations for computers and computer-related accessories, recommendations for electronic equipment (e.g., media players, televisions, speakers, cameras, digital cameras, speakers, etc.), automobile recommendations, Internet service provider recommendations, vacation recommendations, and many other types of recommendations.

Generally, when a user requests advice, the user may be in a situation where he is unsure about how to proceed, how to respond, or how to otherwise act (or not act), and seeks advice from members of the social network to assist with his decision based on the members' past experiences, or even based on the members' initial reactions to the situation. Examples of advice requests can include, without limitation, relationship advice (e.g., issues involving significant others, family, friends, co-workers, etc.), computer advice, automobile repair advice, home improvement/repair advice, gardening advice, and many other types of advice.

Generally, when a user requests assistance, the user is attempting to locate information or perform a task, and seeks assistance from members of the social network. Examples of assistance that can be requested by a user can include, without limitation, computer troubleshooting assistance, assistance with directions to a location, assistance with physical ailments, assistance with finding a particular item at a low price, assistance with school projects or assignments, assistance with research, and many other types of assistance. In some embodiments of the present invention, a request for assistance can include search assistance, such that a user requests assistance from members of the social network in locating information on a network (e.g., the Internet, an intranet, WAN, LAN, the social network, etc.).

Figure 3:
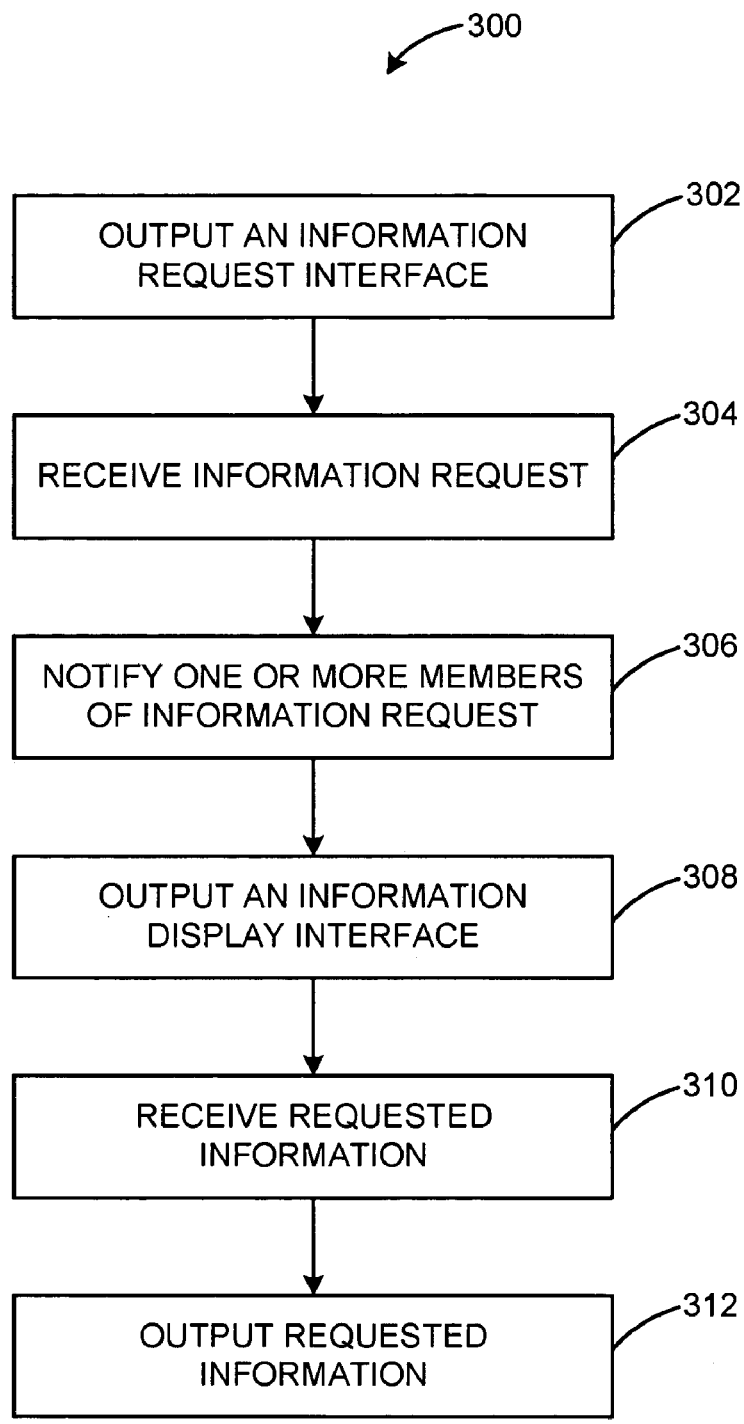
FIG. 3 illustrates a flow diagram of one embodiment of a method of the present invention.

FIG. 3 illustrates a flow diagram of one embodiment of a method of the present invention. As shown in block 302, when a user wishes to request information, embodiments of the present invention can output an information request interface. The information request interface can provide a user with the ability to request information from at least one member of a social network associated with the user. In embodiments of the present invention, the information request interface can be output to the user's client device. The information request interface can be output in any number of ways and in any number of formats including, without limitation, a web page, a pop-up form, an electronic mail form, a printed form, and others.

A user can access the information request interface in any number of ways. For example, when the user is logged onto the social network, a button, hyperlink, menu selection, or other selection feature on a client device can be provided for a user to access the information request interface. The user can use a mouse, keyboard, or other input device to access the information request interface.

As illustrated in block 304, embodiments of the present invention can include receiving an information request. The information request interface can allow a user to input data about the information request. Such data can include, without limitation, a description of the information being sought, parameters related to which members should be notified of the information request, the date and/or time when the information is needed, a description of any previous attempts by the user to locate the information, and others. In some embodiments, certain data may be required to be entered by the user before the information request can be submitted.

While the information request interface can be in any number of formats, the user, in some embodiments, can provide data to the information request interface by completing a form. The form can include blank fields, dropdown menus, pop-up menus, and other ways for providing data, and combinations thereof.

As indicated above, among other data that can be provided to the information request interface, a user can provide parameters related to which members should be notified of the information request. A user may have any number of associations with other members of the social network. Such associations may have different degrees of separation. The user can have a great degree of flexibility in determining which members of the social network should be notified of the information request. This flexibility can advantageously allow a user to protect the privacy or confidentiality of the user's information request (e.g., if the information request is personal or of a sensitive nature), to notify members that are more likely to possess or be aware of the information being sought, and to expand the scope of the members notified if more narrow notifications are unsuccessful, as well as other advantages.

In some embodiments, the user can specify the names of the members that are to be notified. In other embodiments, the user can specify that every member of a community within the social network should be notified. In other embodiments, the user can specify that every member of the social network should be notified.

The user, in some embodiments, can specify members having a particular association with the user and/or a particular degree of separation with the user. For example, the user can specify that only members having a friendship degree of separation of one are to be notified of the request. As another example, if a user is planning a family gathering, the user may specify that only members having a family association are to be notified.

The user can also utilize other associations, such as common characteristic associations, to advantageously notify members that are more likely to possess, have access to, or be aware of the requested information. For example, if the user is seeking recommendations for a Thai restaurant in San Francisco, the user may only notify members that reside in San Francisco or for whom San Francisco is their hometown. The user may also specify that only members that list Thai cuisine as one of their favorite foods are to be notified.

As another example, a user may be having difficulty with a new software application operating on his employer's LAN. The user can submit an information request and specify that members of the social network having a business association of two or less and that work in the field of information technology be notified.

In some embodiments of the present invention, the user can specify a social network engine to choose which members to notify. The social network engine can access a social network database to determine which members of the social network would be best to notify. As described in more detail below, the social network database, in some embodiments, can include data about each member's willingness to assist with information requests and/or each member's assistance quality rating. The social network engine can also use such data in determining which members to notify. Thus, the social network engine, in some embodiments, can notify members who are likely to have the requested information and who are likely to provide the information.

Block 306 of FIG. 3 indicates that after an information request is received, one or more members of the social network can be notified of the information request. In some embodiments, after the user provides data about the information request to the information request interface, the information request is received, and one or more members of the social network can be notified of the user's information request. In some embodiments of the present invention, the information request can be received by a social network engine, which can then notify the appropriate members of the social network. In embodiments where the social network engine is specified to determine which members to notify, the social network engine can analyze the information request and access the social network database.

As discussed above, the one or more members of the social network can be selectively notified based on parameters specified by the user or based on determinations made by the social network engine if the user specifies that the social network engine should determine which members to notify. In some embodiments, notifying one or more members of the social network of the user's information request can comprise notifying a community of the user's information request.

Members of the social network, in some embodiments, can choose not to be notified of information requests. For example, members can modify their profiles to indicate that they do not want to receive information requests. In other embodiments, members can modify their profiles to indicate that they only wish to receive information from other members having a particular association with the member. For example, the member may specify that he only wishes to receive information requests from members having a friendship degree of association of two or less with the member. As another example, if a member is particularly interested in music or providing information related to music, the member may specify that she only wishes to receive information requests from members that have a common characteristic association related to music preferences.

Members of the social network can be notified of an information request in any number of ways. For example, in some embodiments, an icon may appear on the member's profile page indicating that another member has requested information. As another example, a member can choose to view information requests by selecting a "View Information Requests" button or by selecting such an option from a menu. Information requests or certain portions of information requests can automatically be displayed on a member's profile page in other embodiments. For example, information requests from members having a friendship degree of separation of one can automatically be displayed at the bottom of a member's profile page.

In embodiments where a member chooses to view a list of information requests, the information requests can be displayed and sorted in any number of ways. For example, the information requests can be sorted by name of the member requesting the information, by subject matter of information being sought, by date, and by other categories. In some embodiments, information requests can be displayed in summary format, where only certain data about the information request are provided, or in detailed format, where all of the data provided by the user making the request are provided.

After viewing an information request, the member may choose to respond to the information request. The member can indicate a willingness to respond to the information request in any number of ways, such as for example, selecting a button, selecting an icon, selecting a hyperlink, selecting an option on a menu, typing a keystroke, or other ways. In some embodiments, a field may be provided directly below the information request for a member to respond.

Embodiments of the present invention can also include outputting an information delivery interface, as illustrated in block 308 of the embodiment shown in FIG. 3. For example, if a member indicates a willingness to respond to a user's information request, an information delivery interface can be displayed. In some embodiments, a social network engine can cause the information delivery interface to be displayed on a client device of the member. The information delivery interface can be output in any number of ways and in any number of formats including, without limitation, a web page, a pop-up form, an electronic mail form, a printed form, and others.

As shown in block 310, embodiments of the present invention can include receiving requested information. In some embodiments, the information delivery interface can provide one or more members of the social network with the ability to provide the requested information to the user. The information delivery interface can allow a member to provide the requested information in any number of ways. In some embodiments, the information delivery interface can provide a space where a member can provide the requested information. The member can provide the requested information as text, as a hyperlink, in a file, and in other formats.

In addition to the information requested by the user, the information delivery interface, in some embodiments, can allow the member to provide additional information, such as, for example, the member's name, email address, names of other members who might have additional information for the user, and other data. In some embodiments, contact information for the member providing the information can be submitted automatically with the requested information.

When the member has completed entry of the requested information and any other information, the member can indicate that the information is ready to be submitted in any number of ways. For example, the member can click on a hyperlink or button entitled "Completed" or "Submit", click on an icon, select an option on a menu, type a keystroke, press the "Enter" key, or otherwise indicate that she is ready to provide the information.

Block 312 of FIG. 3 illustrates that embodiments of the present invention can include outputting the request information. For example, when a member has provided the requested information to the information delivery interface, the requested information can be delivered to the user who requested the information. In some embodiments, the requested information can be provided to a social network engine, which can then notify the user that a member has provided the requested information. In some embodiments, the social network engine may update a social network database to include the requested information.

The requested information may be stored in a social network database in any number of ways. For example, the requested information may be associated with the information request. In some embodiments, the information request may be stored in the social network database independent of the user who submitted the request, while in other embodiments, the information request may be stored in the user profile of the user who submitted the information request in the social network database.

Embodiments of the present invention can comprise displaying information provided by one or more members. The social network engine, in some embodiments, can retrieve the requested information from the social network database and deliver the requested information to one or more client devices to be displayed.

In some embodiments, the requested information can only be viewed by the user that made the information request. In some embodiments, the user can receive a notification that a member has submitted a response. For example, an icon can be displayed which indicates a response was received. As another example, all of the user's information requests can be viewed on a single page, in a summary format or in a detailed format. The information requests that have received new or unviewed responses can be displayed differently from other information requests in some embodiments. For example, information requests that have received new or unviewed responses can be displayed on a client device in a different font, in a different color, with an icon beside the information request, or with a short message beside the information request (e.g., "2 new responses received").

In some embodiments, the user can view all of the responses to the information request, from the same member or from a plurality of members, at the same time. For example, the information responses provided by a plurality of members can be displayed at a common location, such as a web page, a document, a spreadsheet, or other file. In addition to the requested information, other information can also be displayed, such as, for example, the name of the member that provided the requested information, the member's email address or other ways in which the user might contact the member, a link to the member's profile, the date and/or time the information was submitted, and other information.

In embodiments of the present invention, the user can indicate that he has received the requested information. For example, when the user receives the requested information or when the user no longer wishes to receive information, the user can click a button, click on an icon, select a menu item, enter a keystroke, or take other action to indicate that he no longer wishes to receive information. In some embodiments, when a user indicates that he no longer wishes to receive the requested information, any notifications that may have been provided to members that have not yet viewed the information request can be removed. For example, if an icon appeared in the profile of a member to indicate that an information request had been made, the icon can be removed. If the member received another type of notification (e.g., a message), the message can be removed or recalled.

In some embodiments, the user may want to keep the requested information private, while in other embodiments, the user may believe that other members may be interested in the requested information. For example, if the user was seeking relationship advice, the user may want to keep the information received private. In some embodiments, the information request interface can allow a user to specify that any responses to the information request are to be displayed only to the user. The user, in some embodiments, can also specify that certain responses to the information request are to be displayed only to the user. The user can specify that a particular response be kept private, that some responses be kept private, or that all responses be kept private. In some embodiments, the user can specify that only the members who received the information request can view the responses.

In some embodiments, the user can choose to have the information request and all responses available for viewing. For example, the information request interface can allow the user to specify that the information request and responses can be viewed by others. The user, in some embodiments, can specify which members should be allowed to view the information request and the responses. These members can be the same ones that received the notification, can be a broader group (e.g., all members of the social network), or can be a narrower group.

In some embodiments, the requested information may be such that the user believes that other members of the social network may be interested in viewing the responses. In such embodiments, the user can choose not to restrict access to the responses. In other embodiments, the user can distribute the information request and the information received to members of the social network. The user can choose to distribute the information in the same manner that the user can choose to notify members of the information request initially. For example, in some embodiments, the user can specify the names of the members that are to receive the information. The user, in some embodiments, can specify members having a particular association with the user and/or a particular degree of separation with the user.

Embodiments of the present invention can allow a user to modify the members of the social network that are notified of the information request. For example, the user may specify an initial group of members to receive the information request (e.g., members having a family degree of separation of one with the user), but may not receive the requested information from that initial group. The user, in some embodiments, can modify the scope of members notified. For example, if user initially notified members having a family degree of separation of one, the user could broaden the scope to notify members that have a family degree of separation of two or less and members that have a friendship degree of separation of one. A social network engine, in some embodiments, could ensure that members who were initially notified of the information request would not be notified again when the user broadened the scope.

In some embodiments where the user does not receive the requested information, the user can notify one or more members of the social network that do not have a close association with the user. For example, the user could ask the social network engine to notify other members of the social network, even those not having an association with the user, of the user's information request. In some embodiments, the user can ask the social network to notify members of the social network that are most likely to have the requested information. In some embodiments, the user can ask the social network to notify members of a community within the social network.

In some embodiments, the user can request notification of other members of the social network if the one or more members initially notified do not provide the requested information to the user within a predetermined period of time. The user, in some embodiments, can specify the predetermined period of time. The user can also specify which additional members (e.g., additional associations and/or degrees of separation) should be notified or can request that the social network determine and notify members most likely to provide the requested information.

Embodiments of the present invention can monitor and track the information requests to which a member responds. In some embodiments, the member profile of a member that provides information in response to the information request can be updated to indicate that the member responded. For example, when a member completes an information delivery interface, a social network engine can update the member's profile in a social network database to indicate that the member responded. In some embodiments, the member's profile may not be updated for providing multiple responses to the same information request once the profile has been updated to indicate that an initial response was provided.

In some embodiments, data related to the subject matter of the information request to which a member responds can be stored. Such data can be used to determine the subject areas in which the member may be interested in providing assistance.

A user that submitted an information request, in some embodiments, can rate the quality of a member's response to the information request. In such embodiments, the quality of a member's responses to information requests can also be tracked. For example, when a user views a response to her information request, the user can be provided with the option to rate the response. The rating system can be based on any number of rating scales (e.g., numerical ratings, alphabetical ratings, star ratings, etc.), although the same rating system can be used for all members in the social network for consistency.

When a user rates the quality of the response provided by a member, the rating, in some embodiments, can be stored in the member's profile. In some embodiments, a member's profile can include an average response rating, which may be the average of all ratings submitted for the member's responses to information requests.

Embodiments of the present invention can advantageously use the data related to a member's responses to information requests. The number of responses to information requests by a member, the subjects of information requests to which the member responds, and/or the quality of the member's responses (e.g., as measured by a ratings system) can be used to determine the likelihood that a member might respond to subsequent information requests. Such determinations can be made by a social network engine.

As noted above, in some embodiments, a user may specify that a social network engine should notify the members of the social network most likely to respond to the user's information request. In such embodiments, the social network engine could determine the subject matter of the information request, or ask the user to identify the subject matter of the information request. The social network engine can then search a social network database to identify the members most likely to respond by considering data related to the number of responses to information requests by a member, the subjects of information requests to which the member responds, and/or the quality of the member's responses for each member, or for a subset of the total members.

The social network engine, in some embodiments, can also consider other data in a member's profile, such as whether the member has an interest or interests similar to the subject of the information request, in determining which members to notify. For example, if a user requests recommendations for classical music compact discs, the social network engine might identify members that list classical music as interest and notify them of the information request. To narrow the list of members to notify, the social network engine might also consider the data mentioned above, including number of responses to information requests, the subjects of responses to information requests, and/or the quality of the member's responses.

Data related to a member's responses to information requests can also be used, in some embodiments of the present invention, to provide benefits to members who respond to information requests. Some embodiments of the present invention can include providing a benefit to a member that provides information in response to a predetermined number of information requests. Some embodiments can also consider the quality of the member's responses in determining whether to provide a benefit. For example, a fewer number of the highest rated responses can be required to receive the benefit. In some embodiments, members might acquire "points," "social dollars," or some other form data that can be awarded to members based on the quantity and/or quality of their responses to information requests.

Any number of benefits can be provided to members that qualify to receive the benefit. Examples of such benefits can include, without limitation, gift certificates, clothing, mugs, money, access to premium content in the social network, tickets, travel vouchers, invitations to parties or other social gatherings, and others.

In some embodiments, the social network can comprise a store where a member can use "points" or "social dollars" to purchase items, services, access to premium content, or other benefits. When a member makes a purchase in such embodiments, the member's "points" or "social dollars" can be decreased by the purchased amount.

Members might also be assigned titles or names based on the quantity and/or quality of responses to information requests. Such title or names can be whimsical or fun, in some embodiments, while still giving some indication of the member's willingness to assist.

While the social network can provide incentives for members of the social network to respond to information requests, some members of a social network may not want to be notified of information requests. In some embodiments, a member of the social network may elect not to be notified of information requests. In such embodiments, the social network engine will not notify the member of an information request, even if the member falls within the group of members identified by the user to be notified.

Embodiments of the present invention can be directed to information requests that are requests for search assistance. For example, a user may request assistance from members of the social network in locating information on a network (e.g., the Internet, an intranet, WAN, LAN, the social network, etc.). Some embodiments may use search records, which are discussed in more detail below.

One embodiment of a method can include generating a search record comprising data related to at least one search of a network, wherein the at least one search is based on an information request from a user of a social network; outputting the search record to at least one member of the social network; and updating the search record to include data related to at least one additional search of the network by the at least one member of the social network.

In these embodiments, a user may be trying to locate information on a network (e.g., the Internet, an intranet, WAN, LAN, the social network, etc.). The user can be searching for any type of information that might be found on such networks, such as files, data, reference information about a topic, goods, services, people, directions, contact information, and other information. The user may use a search engine, such as GOOGLE, to facilitate the search.

At some point, the user may determine that he needs assistance finding the information. For example, the user may not find any information, or the user may find some information but suspect that better information exists. In some embodiments, the user may determine that he needs assistance from the outset and may not conduct any searches on his own.

Figure 4:
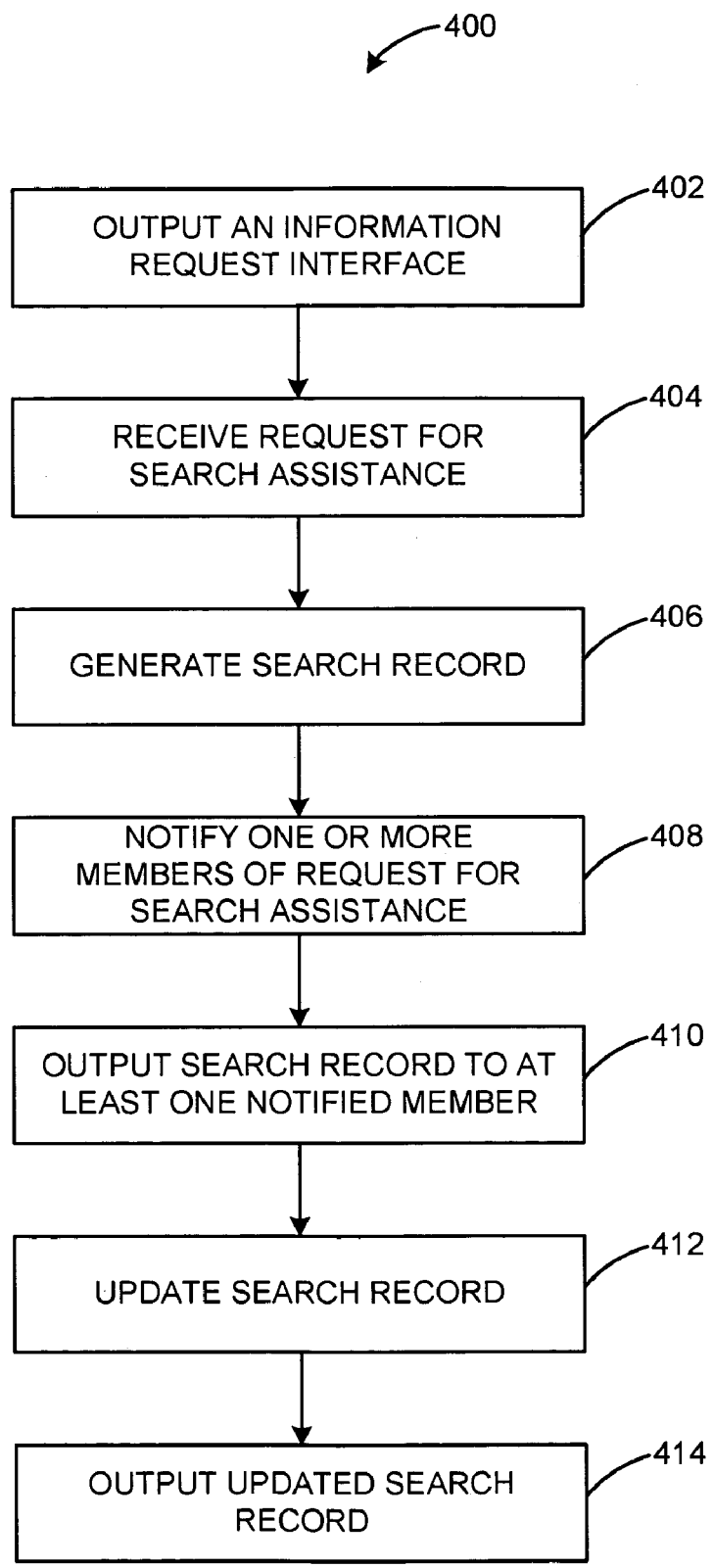
FIG. 4 illustrates a flow diagram of another embodiment of a method of the present invention.

FIG. 4 illustrates a flow diagram of another embodiment of a method of the present invention. As illustrated in block 402, an information request interface can be output. In the social network, the user can access an information request interface as described above in connection with FIG. 3. The information request interface may allow a user to specifically indicate that the information request is a request for search assistance. Block 404 illustrates that embodiments can include receiving a request for search assistance. The information request interface can allow the user to describe the information being sought so that other members can assist with the search.

Embodiments of the present invention can inquire as to whether the user wants to generate a search record. Embodiment of the present invention can include generating a search record as illustrated in block 406. The search record can be a record of search strategies and search results. The search record can include data related to at least one search of a network. The search record can include a variety of data related to searches including, without limitation, search terms, search results, viewed search results, searcher identity, search engine, search rating, and other search data.

The search record can be output to a client device in any number of formats depending on the level of detail preferred by the person viewing the search record. For example, the user that submitted the information request may prefer a more detailed view, while a member that may provide assistance with the search may only want to see a summary view showing past search strategies.

The search record, in some embodiments, can include hyperlinks. For example, if the search record is displayed in a summary view, such that only one line per search is displayed, a hyperlink may be associated with each search. In some embodiments, the user can select the hyperlink and be directed to a file or page that displays the results of the search.

The results of the search can be output in any number of formats. The results of the search, in some embodiments, can be displayed as the results page of a search engine. For example, if the search was an Internet search using GOOGLE, the results can be displayed a results page from a GOOGLE search. Further, when the results of a particular search are displayed, each of the results displayed, in some embodiments, can include a hyperlink to a file, web page, or other location where the information being sought by the user may be found.

As noted above, embodiments of the present invention can inquire as to whether the user wants to generate and maintain a search record. In embodiments where the user has conducted some searches prior to submitting an information request, the user may want to generate the search record based on the user's search strategies. In other embodiments, regardless of whether the user searched independently, the user can specify that a search record be generated to record and summarize the searches submitted by other members. In such embodiments, an empty search record can be generated. Embodiments of the present invention may automatically generate a search record upon the user's indication that the information request is a request for search assistance.

The user can provide other data related to the request for search assistance to the information request interface as set forth in more detail above. For example, the user can provide parameters related to which members should be notified of the request for search assistance. In other embodiments, the user can specify that a social network engine notify members of the social network likely to provide search assistance as set forth in more detail above. In other embodiments, the user can both provide parameters related to which members should be notified of the request for search assistance and specify that the social network engine notify other members likely to provide search assistance.

As shown in block 408 of FIG. 4, one or more members can be notified of the request for search assistance. The members can be notified in any of the ways described above related to information requests generally. With requests for search assistance where a search record has been generated, the notification can also include a hyperlink or other reference to the search record.

Embodiments of the present invention can include outputting the search record to at least one member, as indicated by block 410 in the embodiment shown in FIG. 4. For example, if a member decides to assist a user with the request for search assistance, the member can view the search record on a client device. As noted above, a hyperlink or other reference to the search record can be provided with the notification to the member. The member can view the search record by selecting the hyperlink. In some embodiments, a social network engine causes the display of the search record on the member's client device. The search record, in some embodiments, can be associated with the profile of the user requesting search assistance while in other embodiments, the search record can be stored independently of the user. A social network engine can retrieve the search record from a social network database in some embodiments and cause it to be displayed on a client device of the member.

The search record can be updated in some embodiments as illustrated by block 412. For example, when a member searches for the information requested by the user, the member can update the search record to include data related to the search. The search data can be imported into the search record in any number of ways.

For example, in some embodiments, a member can access a search engine while logged onto the social network. When the member runs a search, a social network engine may ask whether the member wants to export the search and/or the search results to a search record. If the member indicates that she does want to export the search and search results, the member can specify the search record. The social network engine updates the search record to include the search data.

In other embodiments, a hyperlink, a button, a menu option, or the like may be provided with a search engine or on a search engine search results page that allows the member searching to export the search results to a search record.

In embodiments of the present invention, the search record can be updated based on each search. Thus, multiple searches and corresponding search results by a plurality of members of the social network can be included in the search record. When a member decides to assist the user with the request for search assistance, the member can view the search record and view prior search strategies and prior search results. Such a capability can be advantageous as it can reduce the likelihood of duplicate searches, can assist members in formulating strategies for subsequent searches, and can allow the user requesting the search assistance to monitor the development of the searches.

In some embodiments of the present invention, the user can indicate in the search record when he has received the requested information. For example, when the user receives the requested information or when the user no longer wishes to receive search results, the user can click a button, click on an icon, select a menu item, select a hyperlink, enter a keystroke, or take other action to indicate that he no longer wishes to receive information. In some embodiments, when a user indicates that he no longer wishes to receive the requested information, any notifications that may have been provided to members that have not yet viewed the information request can be removed. For example, if an icon appeared in the profile of a member to indicate that a request for search assistance had been made, the icon can be removed. If the member received another type of notification (e.g., a message), the message can be removed or recalled.

Block 414 of FIG. 4 indicates that the updated search record can be output. The updated search record can be output in any number of ways and to any number of people in accordance with embodiments of the present invention. As indicated in the embodiments discussed above, a user receiving search assistance may choose to share the search results and/or the search record with other members of the social network. The user can specify which members can view the search results and/or the search record as set forth above.

In some embodiments, the user can rate the searches and search results in a search record. In some embodiments, the user may provide some or all of the search results with a rating. The rating, in some embodiments, can indicate the usefulness of the search result to the user's information request. Any number of rating systems can be employed including, for example, a numerical rating system, an alphabetical rating system, a star rating system, and others. The user, in some embodiments, may choose to highlight some of the more useful results and, in particular, the most useful search result.

Data related to members' responses to requests for search assistance can be stored as discussed in more detail above. Such data can include, for example, the number of responses to requests for search assistance by a member, the subjects of requests for search assistance to which the member responds, and/or the quality of the member's responses (e.g., as measured by a ratings system). These data can be used in a number of ways including those set forth above, such as to determine the likelihood that a member might respond to subsequent requests for search assistance, to assist a social network engine in identifying which members of a social network to notify about a request for search assistance, to provide benefits to members of the social network who assist with searches, and others. The benefits and benefit systems discussed above can likewise be applied to requests for search assistance.

The search record can be stored in some embodiments of the present invention. For example, the search record can be stored in a social network database. The search record, in some embodiments, can be stored based on the user who requested search assistance. In other embodiments, the search record can be stored based on the subject matter of the search.

By storing the search record based on the subject matter of the search, the search record can be provided to other members of the social network who might request similar information. For example, if a user requests search assistance to find the lowest price on portable MP3 players, the user can be referred to any previously generated search records for the same or similar subject matter. The stored search records can also be useful in embodiments where the social network engine determines which members of the social network to notify of the request for search assistance. For example, the social network engine, in some embodiments, can review search records related to similar subjects to determine which members assisted with similar searches.

As with other embodiments, members of a social network can indicate a willingness to assist with requests for search assistance. Such members can specify, in some embodiments, a number of preferences with regarding to the types of searches and the members for whom they are willing to assist. For example, members can specify that they are only willing to assist with search related to certain subject matter (e.g., sports, music, bargains, travel ideas, etc.). As another example, a member can specify that he is only willing to assist other members having a particular association and/or degree of separation with the member. In other embodiments, members may specify that they do not wish to be notified of any requests for search assistance. In some embodiments, members interested in assisting with request for search assistance can receive a periodic (e.g., daily, weekly, bi-weekly, etc.) list of opportunities to assist with search requests.

General

The foregoing description of the exemplary embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A method comprising:
providing an information request interface, wherein the information request interface allows a user to request information from at least one member of a social network associated with the user;
receiving an information request from the user, wherein the information request comprises at least one of a recommendation request, an advice request, and a request for assistance;
automatically identifying one or more members of the social network to notify of the information request based on stored member data; and
notifying one or more members of the social network of the user's information request.

2. The method of claim 1, wherein the information request comprises a request for search assistance.

3. The method of claim 1, wherein the members of the social network associated with the user have a friendship association degree of separation from the user of one.

4. The method of claim 1, wherein the members of the social network associated with the user have at least one common characteristic association.

5. The method of claim 1, wherein notifying one or more members of the social network of the user's information request comprises selectively notifying one or more members of the social network of the user's information request.

6. The method of claim 5, wherein the one or more members are selectively notified based on parameters specified by the user.

7. The method of claim 6, wherein the one or more selectively notified members have a friendship association degree of separation from the user of one.

8. The method of claim 6, wherein the one or more selectively notified members have at least one common characteristic association with the user.

9. The method of claim 5, wherein the one or more members are selectively notified based on stored member data.

10. The method of claim 9, wherein the stored member data comprise data related to the number of information requests to which the one or more members have responded.

11. The method of claim 9, wherein the stored member data comprise data related to the quality of information provided by the one or more members in response to information requests.

12. The method of claim 9, wherein the stored member data comprise data related to the subject matter of information requests to which the one or more members have responded.

13. The method of claim 1, wherein notifying one or more members of the social network of the user's information request comprises notifying a community of the user's information request.

14. The method of claim 1, further comprising providing an information delivery interface, wherein the information delivery interface allows one or more members of the social network to provide the requested information to the user.

15. The method of claim 1, further comprising receiving requested information from at least one of the notified members.

16. The method of claim 15, further comprising providing the requested information.

17. The method of claim 15, further comprising selectively providing the requested information.

18. The method of claim 17, wherein the requested information is provided to the user.

19. The method of claim 17, wherein the requested information is provided to the user and to one or more of the notified members.

20. The method of claim 17, wherein the requested information is provided to the user and to one or more members of the social network associated with the user.

21. The method of claim 15, wherein information is received from a plurality of members and wherein the information received from the plurality of members is provided at a common location.

22. The method of claim 15, further comprising storing the requested information.

23. The method of claim 1, further comprising updating a profile of a member that provides requested information in response to the information request.

24. The method of claim 23, wherein the member profile comprises data related to the number of information requests to which the member has responded.

25. The method of claim 23, wherein the member profile comprises data related to the quality of the requested information provided by the member.

26. The method of claim 23, wherein the member profile comprises data related to the subject matter of information requests to which the member has responded.

27. The method of claim 1, further comprising notifying one or more members of a social network not associated with the user of the user's information request if one or more members of the social network associated with the user do not provide the requested information to the user within a predetermined period of time.

28. The method of claim 1, further comprising providing a benefit to a member that provides information in response to a predetermined number of information requests.

29. The method of claim 28, wherein the benefit comprises a gift.

30. A method comprising:
providing an information request interface, wherein the information request interface allows a user to request information from at least one member of a social network associated with the user;
receiving an information request from the user, wherein the information request comprises at least one of a recommendation request, an advice request, and a request for assistance;
automatically identifying one or more members of the social network to notify of the information request based on stored member data; notifying one or more members of the social network of the user's information request;
providing an information delivery interface, wherein the information delivery interface allows, the one or more notified members of the social network to provide the requested information to the user;
receiving requested information from at least one of the notified members;
updating a profile of the notified member who provided the requested information; and
providing the requested information.

31. A computer-readable storage medium on which is encoded program code, the program code comprising:
program code for providing an information request interface, wherein the information request interface allows a user to request information from at least one member of a social network associated with the user;
program code for receiving an information request from the user, wherein the information request comprises at least one of a recommendation request, an advice request, and a request for assistance;
program code for automatically identifying one or more members of the social network to notify of the information request based on stored member data; and
program code for notifying one or more members of the social network of the user's information request.

32. The computer-readable storage medium of claim 31, wherein the information request comprises a request for search assistance.

33. The computer-readable storage medium of claim 31, wherein the members of the social network associated with the user have a friendship association degree of separation from the user of one.

34. The computer-readable storage medium of claim 31, wherein the members of the social network associated with the user have at least one common characteristic association.

35. The computer-readable storage medium of claim 31, wherein program code for notifying one or more members of the social network of the user's information request comprises program code for selectively notifying one or more members of the social network of the user's information request.

36. The computer-readable storage medium of claim 35, wherein the one or more members are selectively notified based on parameters specified by the user.

37. The computer-readable storage medium of claim 36, wherein the one or more selectively notified members have a friendship association degree of separation from the user of one.

38. The computer-readable storage medium of claim 36, wherein the one or more selectively notified members have at least one common characteristic association with the user.

39. The computer-readable storage medium of claim 35, wherein the one or more members are selectively notified based on stored member data.

40. The computer-readable storage medium of claim 39, wherein the stored member data comprise data related to the number of information requests to which the one or more members have responded.

41. The computer-readable storage medium of claim 39, wherein the stored member data comprise data related to the quality of information provided by the one or more members in response to information requests.

42. The computer-readable storage medium of claim 39, wherein the stored member data comprise data related to the subject matter of information requests to which the one or more members have responded.

43. The computer-readable storage medium of claim 31, wherein program code for notifying one or more members of the social network of the user's information request comprises program code for notifying a community of the user's information request.

44. The computer-readable storage medium of claim 31, further comprising program code for providing an information delivery interface, wherein the information delivery interface allows one or more members of the social network to provide the requested information to the user.

45. The computer-readable storage medium of claim 31, further comprising program code for receiving requested information from at least one of the notified members.

46. The computer-readable storage medium of claim 45, further comprising program code for providing the requested information.

47. The computer-readable storage medium of claim 45, further comprising program code for selectively providing the requested information.

48. The computer-readable storage medium of claim 47, wherein the requested information is provided to the user.

49. The computer-readable storage medium of claim 47, wherein the requested information is provided to the user and to one or more of the notified members.

50. The computer-readable storage medium of claim 47, wherein the requested information is provided to the user and to one or more members of the social network associated with the user.

51. The computer-readable storage medium of claim 45, wherein information is received from a plurality of members and wherein the information received from the plurality of members is provided at a common location.

52. The computer-readable storage medium of claim 45, further comprising program code for storing the requested information.

53. The computer-readable storage medium of claim 31, further comprising program code for updating a profile of a member that provides requested information in response to the information request.

54. The computer-readable storage medium of claim 53, wherein the member profile comprises data related to the number of information requests to which the member has responded.

55. The computer-readable storage medium of claim 53, wherein the member profile comprises data related to the quality of the requested information provided by the member.

56. The computer-readable storage medium of claim 53, wherein the member profile comprises data related to the subject matter of information requests to which the member has responded.

57. The computer-readable storage medium of claim 31, further comprising program code for notifying one or more members of a social network not associated with the user of the user's information request if one or more members of the social network associated with the user do not provide the requested information to the user within a predetermined period of time.

58. The computer-readable storage medium of claim 31, further comprising program code for providing a benefit to a member that provides information in response to a predetermined number of information requests.

59. The computer-readable storage medium of claim 58, wherein the benefit comprises a gift.

\* \* \* \* \*

UNITED STATES PATENT AND TRADEMARK OFFICE
CERTIFICATE OF CORRECTION

PATENT NO. : 7,359,894 B1
APPLICATION NO. : 10/881643
DATED : April 15, 2008
INVENTOR(S) : Jason B. Liebman and Krishna A. Bharat It is certified that error appears in the above-identified patent and that said Letters Patent is hereby corrected as shown below:

Column 5, line 53
Please delete "220-234" and insert --218-234--

Column 5, line 58
Please delete "220-234" and insert --218-234--

Column 6, line 14
Please delete "220-234" and insert --218-234--

Column 6, line 42
Please delete "a" after the word "example,"

Column 6, line 46
Please delete "220" and insert --222--

Column 7, line 9
Please delete "associations" and insert --association--

Column 10, line 35
After the word "information" please insert --requests--

Column 16, line 49
Please insert --as-- after "displayed"

Column 19, line 10
Please delete "regarding" and insert --regard--

UNITED STATES PATENT AND TRADEMARK OFFICE
CERTIFICATE OF CORRECTION

PATENT NO. : 7,359,894 B1
APPLICATION NO. : 10/881643
DATED : April 15, 2008
INVENTOR(S) : Jason B. Liebman and Krishna A. Bharat It is certified that error appears in the above-identified patent and that said Letters Patent is hereby corrected as shown below:

Column 21, line 18
Please delete "," after the word "allows"

Signed and Sealed this

Twelfth Day of August, 2008

JON W. DUDAS
*Director of the United States Patent and Trademark Office*